(12) United States Patent
Kim et al.

(10) Patent No.: US 9,877,279 B2
(45) Date of Patent: Jan. 23, 2018

(54) METHOD AND APPARATUS FOR TRANSMITTING CONTROL INFORMATION FOR INTERFERENCE MEASUREMENT IN A WIRELESS COMMUNICATION SYSTEM

(71) Applicant: Samsung Electronics Co., Ltd., Suwon-si, Gyeonggi-do (KR)

(72) Inventors: Younsun Kim, Seongnam-si (KR); Youngbum Kim, Seoul (KR); Hyojin Lee, Suwon-si (KR); Hyoungju Ji, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 62 days.

(21) Appl. No.: 14/193,515

(22) Filed: Feb. 28, 2014

(65) Prior Publication Data

US 2014/0241273 A1 Aug. 28, 2014

(30) Foreign Application Priority Data

Feb. 28, 2013 (KR) .................. 10-2013-0021841

(51) Int. Cl.
*H04W 52/02* (2009.01)
*H04J 11/00* (2006.01)
(Continued)

(52) U.S. Cl.
CPC ....... *H04W 52/0216* (2013.01); *H04J 11/005* (2013.01); *H04L 5/0048* (2013.01);
(Continued)

(58) Field of Classification Search
CPC ............. H04W 52/02; H04W 52/0209; H04W 52/2016; H04W 52/0216
See application file for complete search history.

(56) References Cited

U.S. PATENT DOCUMENTS

2011/0019776 A1  1/2011  Zhang et al.
2012/0188988 A1  7/2012  Chung et al.
(Continued)

FOREIGN PATENT DOCUMENTS

JP  WO 2012129803 A1 * 10/2012 ........... H04B 7/0452

OTHER PUBLICATIONS

ZTE, 'Mechanisms for interference avoidance and coordination in small cell scenarios', R1-130135, 3GPP TSG RAN WG1 #72, Jan. 28, 2013-Feb. 1, 2013.
(Continued)

*Primary Examiner* — Feben M Haile
(74) *Attorney, Agent, or Firm* — Jefferson IP Law, LLP

(57) ABSTRACT

A method and apparatus for transmitting control information to a User Equipment (UE) by an evolved Node B (eNB) for interference measurement in a wireless communication system are provided. The eNB determines whether the UE can perform interference management for receiving a data signal transmitted from the eNB based on information of an interference signal. When it is determined that the UE can perform the interference management, the eNB transmits to the UE configuration information for receiving the data signal by applying the interference management by the UE, and then transmits to the UE downlink control information including transmission power control information indicating whether a transmission power of a DeModulation Reference Signal (DMRS) corresponding to the interference signal is different from a transmission power of the interference signal.

20 Claims, 15 Drawing Sheets

(51) Int. Cl.
*H04L 5/00* (2006.01)
*H04W 52/32* (2009.01)

(52) U.S. Cl.
CPC ......... *H04L 5/0053* (2013.01); *H04W 52/325* (2013.01); *Y02B 60/50* (2013.01)

(56) References Cited

U.S. PATENT DOCUMENTS

| | | | | |
|---|---|---|---|---|
| 2012/0275415 | A1* | 11/2012 | Wang | H04L 1/0041 370/329 |
| 2012/0282864 | A1 | 11/2012 | Dimou et al. | |
| 2012/0314667 | A1* | 12/2012 | Taoka | H04B 7/0452 370/329 |
| 2013/0250788 | A1* | 9/2013 | Kim | H04W 24/10 370/252 |
| 2014/0126404 | A1* | 5/2014 | Kim et al. | 370/252 |
| 2014/0233407 | A1* | 8/2014 | Pourahmadi et al. | 370/252 |
| 2014/0243002 | A1* | 8/2014 | Muruganathan et al. | 455/450 |
| 2014/0307569 | A1* | 10/2014 | Barbieri | H04L 5/0032 370/252 |
| 2015/0071208 | A1* | 3/2015 | Seo | H04L 5/0048 370/329 |
| 2015/0078257 | A1* | 3/2015 | Wu | H04L 25/0224 370/328 |
| 2015/0289280 | A1* | 10/2015 | Davydov | H04W 72/12 370/252 |
| 2015/0373569 | A1* | 12/2015 | Hwang | H04J 11/0023 370/235 |

OTHER PUBLICATIONS

New Postcom, 'Mechanisms of Interference Avoidance and Coordination Among Small Cells', R1-130190, 3GPP TSG RAN WG1 #72, Jan. 28, 2013-Feb. 1, 2013.

Nikolaos I Miridakis et al: "A Survey on the Successive Interference Cancellation Performance for Single-Antenna and Multiple-Antenna OFDM Systems", IEEE Communications Surveys and Tutorials, Institute of Electrical and Electronics Engineers, US, vol. 15, No. 1, Jan. 1, 2013, pp. 312-335, XP011493349, ISSN: 1553-877X, DOI: 0.1109/SURV.2012.030512.00103.

* cited by examiner

METHOD AND APPARATUS FOR TRANSMITTING CONTROL INFORMATION FOR INTERFERENCE MEASUREMENT IN A WIRELESS COMMUNICATION SYSTEM

CROSS-REFERENCE TO RELATED APPLICATION(S)

This application claims the benefit under 35 U.S.C. § 119(a) of a Korean patent application filed on Feb. 28, 2013 in the Korean Intellectual Property Office and assigned Serial number 10-2013-0021841, the entire disclosure of which is hereby incorporated by reference.

TECHNICAL FIELD

The present disclosure relates to a method and apparatus for transmitting control information for interference measurement in a wireless communication system. More particularly, the present disclosure relates to a method and apparatus for estimating information of an interference signal in order to improve the reception capability of a User Equipment (UE) receiving a downlink signal.

BACKGROUND

The mobile communication system has evolved into a high-speed, high-quality wireless packet data communication system to provide data services and multimedia services beyond the early voice-oriented services. Recently, various mobile communication standards, such as High Speed Downlink Packet Access (HSDPA) and High Speed Uplink Packet Access (HSUPA), Long Term Evolution (LTE), and Long Term Evolution-Advanced (LTE-A), which are defined in the 3rd Generation Partnership Project (3GPP), High Rate Packet Data (HRPD) as defined in the 3rd Generation Partnership Project-2 (3GPP2), and Institute of Electrical and Electronics Engineers (IEEE) 802.16, have been developed to support the high-speed, high-quality wireless packet data communication services. Especially, an LTE system, which is a system developed in order to efficiently support high speed wireless packet data transmission, uses various wireless access technologies to maximize the wireless system capacity. An LTE-A system corresponds to an advanced wireless system development of the LTE system and has an improved data transmission capacity in comparison with the LTE system.

In general, the term LTE refers to evolved Node B (eNB) and User Equipment (UE) apparatuses corresponding to Release 8 or 9 of the 3GPP standard organization and the LTE-A refers to eNB and UE apparatuses corresponding to Release 10 of the 3GPP standard organization. The 3GPP standard organization has standardized the LTE-A system and is now developing a standardization of a subsequent Release having improved performance based on the standardized LTE-A system.

Existing 3rd Generation and 4th Generation wireless packet data communication systems such as HSDPA, HSUPA, HRPD, LTE/LTE-A, use an Adaptive Modulation and Coding (AMC) scheme and a channel-sensitive scheduling scheme to improve transmission efficiency. With the use of the AMC method, a transmitter can adjust the amount of transmission data according to the channel state. That is, when the channel state is poor, the transmitter reduces the amount of transmission data to adjust the reception error rate to a desired level, and when the channel state is good, the transmitter increases the amount of transmission data to adjust the reception error rate to the desired level and to efficiently transmit a large volume of information.

With the use of the channel-sensitive scheduling-based resource management method, the transmitter selectively provides a service to a user having a good channel state among a plurality of users, thus increasing the system capacity compared to the method of assigning a channel to one user and providing a service to the user with the assigned channel. Such a capacity increase as in the above description is referred to as "multi-user diversity gain". In summary, the AMC method and the channel-sensitive scheduling method each are a method of applying the appropriate modulation and coding techniques at the most efficient time determined according to the partial channel state information fed back from a receiver.

The AMC scheme, when used together with a Multiple Input Multiple Output (MIMO) transmission scheme, may include a function of determining the rank or the number of spatial layers of a transmission signal. In this event, the AMC scheme determines an optimal data rate in consideration of the number of layers for transmission using MIMO as well as a code rate and a modulation scheme.

The MIMO transmission scheme using a plurality of transmission antennas for transmission of wireless signals is divided into Single User-MIMO (SU-MIMO) for transmission to one UE and Multiple User-MIMO (MU-MIMO) for transmission to a plurality of UEs using identical time and frequency resources. In the case of SU-MIMO, a plurality of transmission antennas transmit wireless signals to a plurality of spatial layers for one receiver. In this event, the receiver requires a plurality of reception antennas, in order to support the plurality of spatial layers. In contrast, in the case of MU-MIMO, a plurality of transmission antennas transmit wireless signals to a plurality of spatial layers for a plurality of receivers. The MU-MIMO is more advantageous than the SU-MIMO in that the MU-MIMO does not require a receiver to be equipped with a plurality of reception antennas. However, the MU-MIMO is disadvantageous in that, since wireless signals are transmitted to a plurality of receivers through the same frequency and time resource, interference may occur between the wireless signals for different receivers.

The LTE and LTE-A have employed various standard technologies for supporting Coordinated Multi-Point Transmission and Reception (CoMP), which is a cooperative communication, in order to control the interference. Further, there is a method in the related art in which a UE performs interference management. In order for a UE to perform interference management, it is necessary to accurately measure information, such as reception intensity and channel, of each interference signal.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide information for interference measurement to enable a User Equipment (UE) receiving a downlink signal in a Long Term Evolution (LTE)-Advanced (LTE-A) system-based communication system to perform interference management based on accurate interference measurement, so as to improve the reception capability of the UE.

In accordance with an aspect of the present disclosure, a method of transmitting control information to a User Equipment (UE) by an evolved Node B (eNB) in a wireless communication system is provided. The method includes determining whether the UE can perform interference management for receiving a data signal transmitted from the eNB based on information of an interference signal, when it is determined that the UE can perform the interference management, transmitting, to the UE, configuration information for receiving the data signal by applying the interference management by the UE, and transmitting, to the UE, downlink control information including transmission power control information indicating whether a transmission power of a DeModulation Reference Signal (DMRS) corresponding to the interference signal is different from a transmission power of the interference signal.

In accordance with another aspect of the present disclosure, a method of receiving control information from an eNB by a UE in a wireless communication system is provided. The method includes transmitting, to the eNB, information on whether the UE can perform interference management for receiving a data signal transmitted from the eNB based on information of an interference signal, receiving, from the eNB, configuration information for receiving the data signal by applying the interference management, receiving, from the eNB, downlink control information including transmission power control information indicating whether a transmission power of a DMRS corresponding to the interference signal is different from a transmission power of the interference signal, and estimating information of the interference signal by measuring the DMRS corresponding to the interference signal based on the transmission power control information, and receiving the data signal by using a result of the estimating.

In accordance with another aspect of the present disclosure, an eNB for transmitting control information to a UE in a wireless communication system is provided. The eNB includes a transceiver configured to transmit and receive a signal to and from the UE, and a controller configured to determine whether the UE can perform interference management for receiving a data signal transmitted from the eNB based on information of an interference signal, to transmit configuration information for receiving the data signal by applying the interference management by the UE when it is determined that the UE can perform the interference management, and to transmit downlink control information including transmission power control information indicating whether a transmission power of a DeModulation Reference Signal (DMRS) corresponding to the interference signal is different from a transmission power of the interference signal, to the UE.

In accordance with another aspect of the present disclosure, a UE for receiving control information from an eNB in a wireless communication system is provided. The UE includes a transceiver configured to transmit and receive a signal to and from the eNB, and a controller configured to transmit, to the eNB, information on whether the UE can perform interference management for receiving a data signal transmitted from the eNB based on information of an interference signal, to receive, from the eNB, configuration information for receiving the data signal by applying the interference management, to receive, from the eNB, downlink control information including transmission power control information indicating whether a transmission power of a DMRS corresponding to the interference signal is different from a transmission power of the interference signal, to estimate information of the interference signal by measuring the DMRS corresponding to the interference signal based on the transmission power control information, and to receive the data signal by using a result of the estimating.

In a method and an apparatus for transmitting control information for interference measurement in a wireless communication system according to the present disclosure, control information for measurement of a DMRS of an interference signal is provided to a UE for estimation of interference signal information for reception of a downlink signal. Therefore, the method and the apparatus according to the present disclosure can improve the accuracy of the interference estimation and the signal reception capability.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Further, in the detailed description of embodiments of the present disclosure, an Orthogonal Frequency Division Multiplexing (OFDM)-based wireless communication system, especially $3^{rd}$ Generation Partnership Project (3GPP) Evolved Universal Terrestrial Radio Access (EUTRA), is mainly discussed. However, the main idea of the present disclosure is applicable to other communication systems having similar technical backgrounds or channel types through a small modification without departing from the scope of the present disclosure, which can be made by one skilled in the art.

Recently, intensive research is being conducted to replace Code Division Multiple Access (CDMA), which is a multiple access scheme used in the 2nd and 3rd generation mobile communication systems, with Orthogonal Frequency Division Multiple Access (OFDMA) in the next generation system. 3GPP and 3GPP2 have started their standardizations on the evolved systems employing OFDMA. It is generally known that the OFDMA scheme, compared to the CDMA scheme, can increase expected capacity. One of the several means of bringing about the capacity increase in the OFDMA scheme is that the OFDMA scheme can perform scheduling on the frequency axis (Frequency Domain Scheduling). Although a capacity gain is acquired according to the time-varying channel characteristic using the channel-sensitive scheduling method, it is possible to obtain a higher capacity gain by using the frequency-varying channel characteristic.

Figure 1:
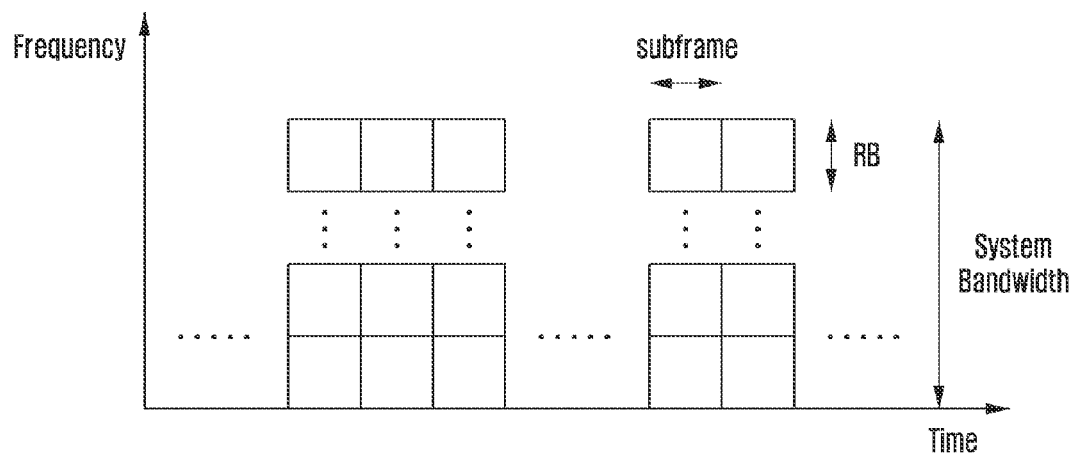
FIG. 1 illustrates time and frequency resources in a Long Term Evolution (LTE)/LTE-Advanced (LTE-A) system according to an embodiment of the present disclosure.

FIG. 1 illustrates time and frequency resources in a Long Term Evolution (LTE)/LTE-Advanced (LTE-A) system according to an embodiment of the present disclosure.

Referring to FIG. 1, wireless resources transmitted from an evolved Node B (eNB) to a User Equipment (UE) are divided by units of Resource Blocks (RBs) on the frequency axis and by units of sub-frames on the time axis. In the LTE/LTE-A system, one RB is generally configured by 12 sub-carriers and occupies a band of 180 kiloHertz (kHz). In contrast, in the LTE/LTE-A system, one sub-frame is generally configured by 14 OFDM symbol intervals and occupies a time interval of 1 millisecond (msec). In performing the scheduling, the LTE/LTE-A system can allocate resources by the units of sub-frames on the time axis and by the units of RBs on the frequency axis.

Figure 2:
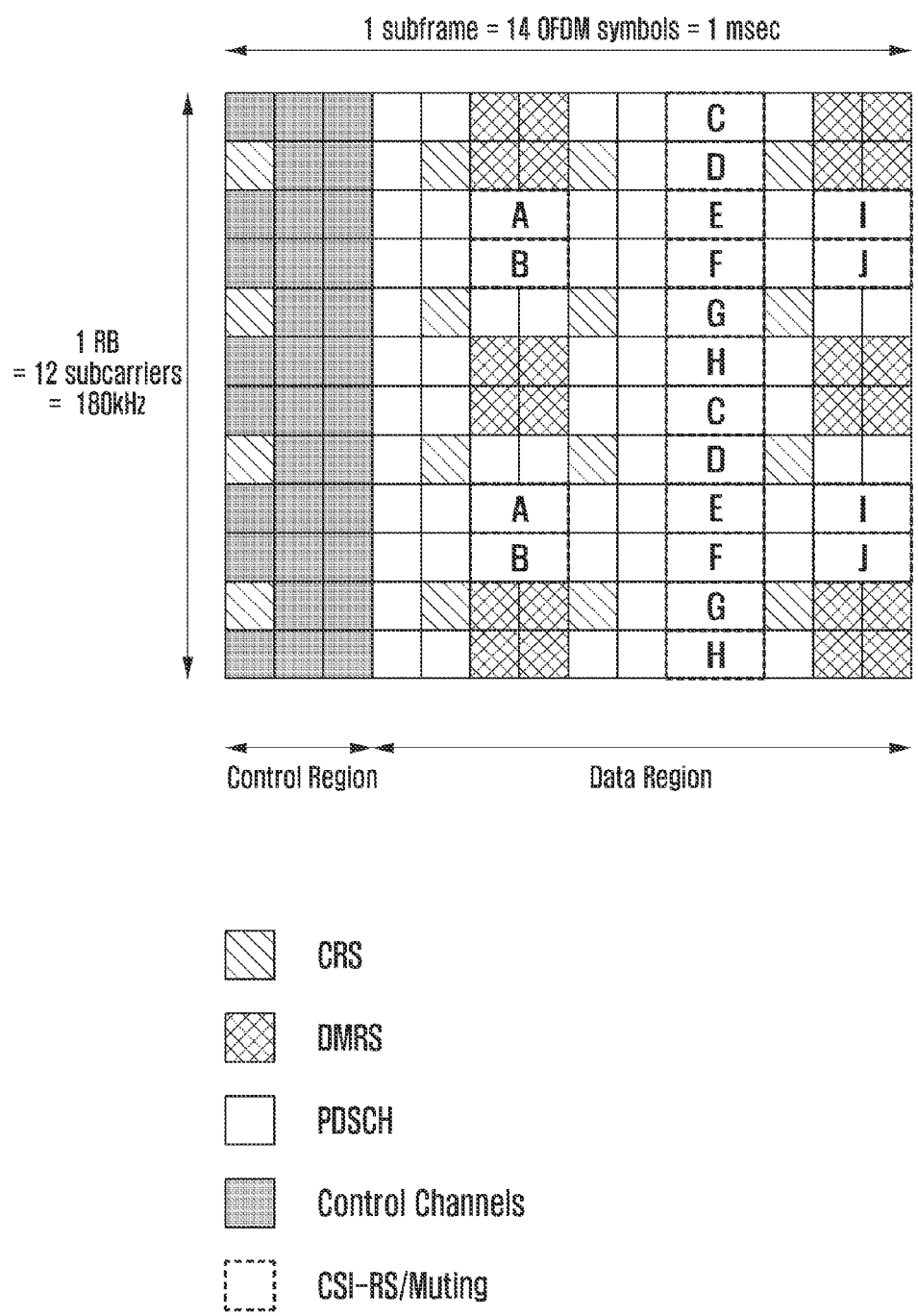
FIG. 2 illustrates a wireless resource of one sub-frame and one Resource Block (RB), which is a minimum unit schedulable in the downlink in the LTE/LTE-A system according to an embodiment of the present disclosure.

FIG. 2 illustrates a wireless resource of one sub-frame and one RB, which is a minimum unit schedulable in the downlink in the LTE/LTE-A system according to an embodiment of the present disclosure.

Referring to FIG. 2, the wireless resource is configured by one sub-frame on the time axis and one RB on the frequency axis. The wireless resource is configured by 12 sub-carriers in the frequency domain and 14 OFDM symbols in the time domain, and thus has a total of 168 specific frequency and time positions. In the LTE/LTE-A system, each of the specific frequency and time positions of FIG. 2 is referred to as a Resource Element (RE). Further, one sub-frame is configured by two slots, each of which is configured by seven OFDM symbols.

The wireless resource shown in FIG. 2 may be used for transmission of different types of signals as follows.

1. Cell-Specific Reference Signal (CRS): a reference signal transmitted for all UEs belonging to one cell.
2. Demodulation Reference Signal (DMRS): a reference signal transmitted for a particular UE.
3. Physical Downlink Shared CHannel (PDSCH): a data channel which is transmitted in the downlink, is used by an eNB to transmit traffic to a UE, and is transmitted using a RE not used for transmission of a reference signal in a data region of FIG. 2.
4. Channel Status Information-Reference Signal (CSI-RS): a reference signal which is transmitted to UEs belonging to one cell and is used for measurement of the channel state. A plurality of CSI-RSs may be transmitted in one cell.
5. Other control channels (Physical Hybrid-ARQ Indicator Channel (PHICH), Physical Control Format Indicator Channel (PCFICH), and Physical Downlink Control Channel (PDCCH)): control channels for provision of control information used for reception of a PDSCH by a UE or for transmission of an ACKnowledge (ACK)/Non-ACKnowledge (NACK) for operation of Hybrid Automatic repeat ReQuest (HARQ) with respect to uplink data transmission.

In addition to transmission of the signals enumerated above, the LTE-A system allows configuration of muting, by which a CSI-RS transmitted from another eNB can be received without interference by UEs of a corresponding cell. The muting can be applied to a position at which a CSI-RS can be transmitted, and a UE generally skips a corresponding wireless resource in receiving a traffic signal. In the LTE-A system, the muting is also referred to as a zero-power CSI-RS because the muting is applied to a position of a CSI-RS and a transmission power is not transmitted in the position of the muting.

In FIG. 2, CSI-RSs may be transmitted using a part of the positions marked by A, B, C, D, E, F, G, H, I, and J according to the number of antennas for transmission of the CSI-RSs. Further, the muting may be also applied to a part of the positions marked by A, B, C, D, E, F, G, H, I, and J. Especially, the CSI-RSs may be transmitted using 2, 4, or 8 REs according to the number of antenna ports for transmission thereof. That is, the CSI-RSs are transmitted using one-half of the positions marked by a particular pattern in FIG. 2 when the number of antenna ports is 2, using all of the positions marked by the particular pattern when the number of antenna ports is 4, and using the positions marked by two patterns when the number of antenna ports is 8. In contrast, the muting is always performed by the unit of one pattern. That is, the muting may be applied to a plurality of patterns. However, the muting cannot be applied to only a part of one pattern unless the positions for the muting and the CSI-RS overlap each other. Only when the positions for the muting and the CSI-RS overlap each other, the muting can be applied to only a part of one pattern.

In a cellular communication system, a reference signal is transmitted in order to measure a downlink channel state. In the case of an LTE-A system of the 3GPP, a UE measures a channel state between an eNB and the UE by using a CSI-RS transmitted by the eNB. The measurement of the channel state basically requires consideration of several elements, which include the quantity of interference in the downlink. The quantity of interference in the downlink includes a thermal noise and an interference signal generated by an antenna belonging to a neighbor eNB, and is important for a UE to determine a channel state of the downlink.

For example, in the case of transmission from an eNB having one transmission antenna to a UE having one reception antenna, the UE should determine the quantity of interference to be simultaneously received in an interval for receiving a corresponding symbol and the energy of each symbol receivable in the downlink in a reference signal received from the eNB, to determine a Signal to Noise plus Interference Ratio (SNIR). The SNIR corresponds to a value obtained by dividing a power of a received signal by an intensity of an interference plus noise signal. In general, the higher the SNIR, the better the reception capability and the higher the data transmission speed. The determined SNIR, a value corresponding to the determined SNIR, or the maximum data transmission speed supportable by the determined SNIR are reported to the eNB, so that the eNB can determine the data transmission speed at which the eNB will transmit data to the UE.

In the case of a general mobile communication system, an eNB apparatus is disposed at a central position of each cell and performs mobile communication with a UE by using one antenna or a plurality of antennas located in a limited area. A mobile communication system in which antennas belonging to one cell are located at the same position is called a Centralized Antenna System (CAS). In contrast, a mobile communication system in which antennas (Remote Radio Heads (RRHs)) belonging to one cell are located at distributed positions in the cell is called a Distributed Antenna System (DAS).

Figure 3:
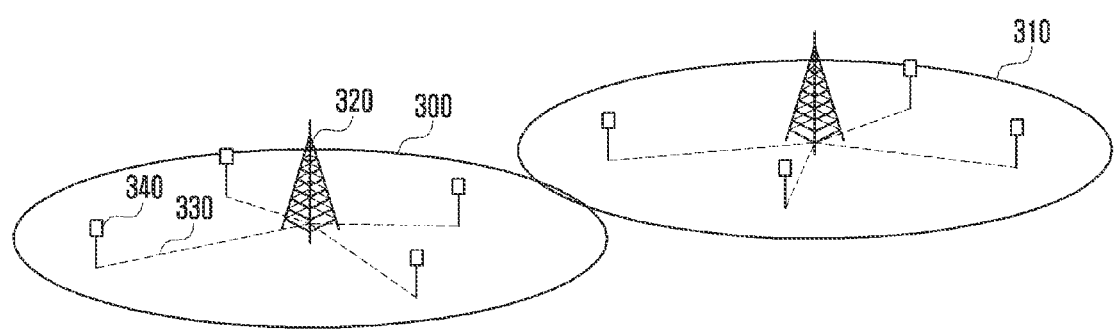
FIG. 3 illustrates an arrangement of antennas at distributed positions in a typical distributed antenna system according to an embodiment of the present disclosure.

FIG. 3 illustrates an arrangement of antennas at distributed positions in a typical distributed antenna system according to an embodiment of the present disclosure.

Referring to FIG. 3, the system corresponds to a distributed antenna system configured by two cells including a cell 300 and a cell 310. The cell 300 includes one high power antenna 320 and four low power antennas 340. The high power antenna 320 enables provision of at least minimum service to the entire cell 300 area while the low power antennas 340 can provide a service based on a high data rate to limited UEs in limited areas within the cell 300. Further, the low power antennas 340 and the high power antenna 320 are connected to a central controller as indicated by reference numeral 330 and operate according to the wireless resource allocation and the scheduling of the central controller. In a distributed antenna system as described above, one or a plurality of antennas may be located at one terrestrially separated antenna position. In the present disclosure, an antenna or antennas disposed at the same position in a DAS are called an antenna group (or RRH group). In general, an expression of "Transmission Point (TP)" may be used in place of the term "antenna group."

In a DAS as shown in FIG. 3, a UE receives a signal from one terrestrially separated antenna group, and a signal transmitted from another antenna group serves as interference to the UE.

Figure 4:
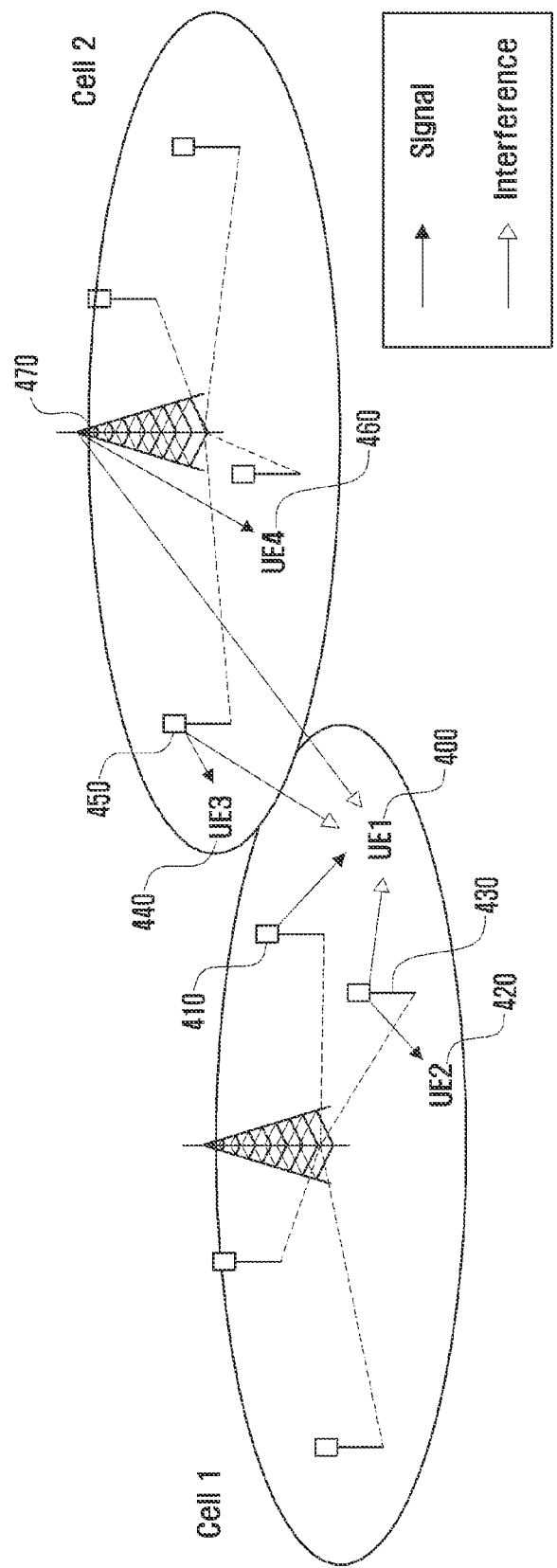
FIG. 4 illustrates occurrence of interference in the case of transmission to different User Equipments (UEs) according to antenna groups in a distributed antenna system according to an embodiment of the present disclosure.

FIG. 4 illustrates an occurrence of interference in the case of transmission to different UEs according to antenna groups in a distributed antenna system according to an embodiment of the present disclosure.

Referring to FIG. 4, UE1 400 in Cell1 receives a traffic signal from an antenna group 410. In contrast, UE2 420 in Cell 1 receives a signal from an antenna group 430, UE3 440 in a Cell 2 receives a signal from an antenna group 450, and UE4 460 in Cell 2 receives a signal from an antenna group 470. Simultaneously while receiving a traffic signal from the antenna group 410, the UE1 400 receives interference from other antenna groups 430, 450, and 470 transmitting traffic signals to the other UEs 420, 440, and 460. That is, the signals transmitted from the antenna groups 430, 450, and 470 cause interference to UE1 400.

In general, interference generated by another antenna group in a distributed antenna system include two types of interference as follows.

Inter-TP interference, i.e., interference generated by another antenna group or at another transmission point; and Intra-TP interference, i.e., interference generated by the same antenna group or at the same transmission point.

In general, the inter-TP interference refers to interference generated while a transmission point, which does not transmit a data signal to a UE, performs transmission to another UE. In contrast, the intra-TP interference refers to an interference generated in a process in which a transmission point transmitting a data signal to a UE simultaneously performs transmission to another UE.

That is, the intra-TP interference is interference caused by and to signals simultaneously transmitted to a plurality of UEs through Multi-user Multiple Input Multiple Output (MU-MIMO) from one transmission point. Due to this reason, the intra-TP interference may also be referred to as MU-MIMO interference. The MU-MIMO refers to transmission to a plurality of UEs by using the same frequency and time resource from one transmission point through a plurality of transmission antennas. In the MU-MIMO transmission as described above, signals transmitted to different UEs might cause interference to each other when they are not sufficiently spatially separated from each other.

In general, when a UE receives a wireless signal, a desired signal is received together with noise and interference. That is, the received signal can be mathematically expressed by Equation (1) below.

$$r = s + \text{noise} + \text{interference} \qquad \text{Equation . . . (1)}$$

In Equation (1), r indicates a received signal, s indicates a transmitted signal, noise indicates noise having a Gaussian distribution, and interference indicates an interference signal generated in a wireless communication. The interference signal in Equation (1) may be generated in the following situations.

Inter-TP interference: in a case where a signal transmitted by an adjacent transmission point in an adjacent cell or a distributed antenna system causes interference to a desired signal.

Intra-TP interference: in a case where signals for different users cause interference to each other in MU-MIMO transmission using a plurality of antennas by one transmission point.

Therefore, the value of the SNIR calculated by the UE may change according to the size of the interference signal and may thus have an effect on the reception capability. In general, the interference is the largest factor degrading the system performance, and methods to properly control the interference significantly affect the system performance. The LTE and LTE-A have employed various standard technologies for supporting Coordinated Multi-Point Transmission and Reception (CoMP), which is a cooperative communication, in order to control the interference. In the CoMP, a network synthetically performs a centralized control of transmission at a plurality of eNBs or transmission points, so as to determine even the size and the existence/absence of interference in the downlink and the uplink. For example, when two eNBs exist, a central controller of a network may interrupt signal transmission at one eNB #2 in order to prevent occurrence of interference to a UE receiving a signal from another eNB #1.

In addition to the cooperative communication, such as CoMP, another method for effectively managing interference is to effectively suppress the interference, converting the interference to white noise, remove the interference, or avoid the interference by a UE receiver. To this end, a process in which a UE receiver accurately measures the interference and manages the measured interference is necessary.

As a method to manage the interference, a UE may use Interference Rejection Combining (IRC). A UE using the IRC determines a combining weight to suppress interference in a process of combining signals received through a plurality of reception antennas.

Another method for managing interference by a UE is to apply Successive Interference Cancellation (SIC). A UE using SIC first detects an interference signal and then extracts the interference signal from a received signal, to remove the interference.

Another method to cope with interference by a UE is to improve a reception capability of a UE by the UE using previous knowledge of a modulation scheme that the interference uses.

As described above, various methods can be employed in order to manage interference. However, in order to use such methods, accurate interference measurement is necessary. That is, only when a UE receiver can perform accurate measurement of interference can the UE receiver perform an efficient reception operation in response to the interference.

In a cellular mobile communication system, a plurality of signals may simultaneously cause interference to a UE. Among the signals, a particular interference signal may often cause relatively high interference. Such an interference signal is usually called a dominant interference.

For example, in inter-TP interference, signals transmitted from a plurality of transmission points may act as interference. However, it is highly probable that, among the interference signals generated by the plurality of transmission points, an interference signal generated at a transmission point nearest to a UE may act as a dominant interference. In order to apply the above-described interference management methods by a UE receiver, it is necessary to accurately separate the dominant interference and a non-dominant interference from each other for measurement. That is, a UE needs to accurately measure information on a reception intensity of an interference signal, a channel of the interference signal, etc., with respect to the dominant interference and the non-dominant interference.

In LTE/LTE-A Release 11, when a UE performs interference management for improving the reception capability of a PDSCH by which a data signal is transmitted, a means by which the UE can accurately measure information on the interference is not provided in the related art.

In the LTE/LTE-A, when a UE receives a PDSCH, in order to measure an interference signal received through the same time and frequency resource, the UE may first receive a CRS or DMRS, which is a reference signal, and perform channel estimation by using the received reference signal, to obtain a difference between the received signal and a value obtained through the channel estimation. That is, the UE may perform channel estimation, obtain a difference between a signal obtained through the channel estimation and the received CRS, and then assume the obtained difference as an interference signal.

This method is problematic in that it is impossible thereby to accurately separate the dominant interference and a non-dominant interference from each other for measurement. Further, interference measurement using a CRS or DMRS may allow overlapping of CRSs or DMRSs of different transmission points at the same wireless resource, which may increase inaccuracy of the interference measurement. Moreover, interference measurement based on a CRS has a very low accuracy in a distributed antenna system and cannot reflect the effect of precoding in a MIMO transmission.

Due to the reasons described above, a UE must perform interference management using an interference measurement value that varies from the real interference value. As a result, even in the case of applying an interference management method, the UE cannot achieve an optimal performance improvement due to the inaccurate interference measurement.

The present disclosure provides a method of providing information for interference measurement by an eNB, so as to enable a UE to perform accurate interference measurement when applying an interference management method in an LTE/LTE-A system.

Figure 5:
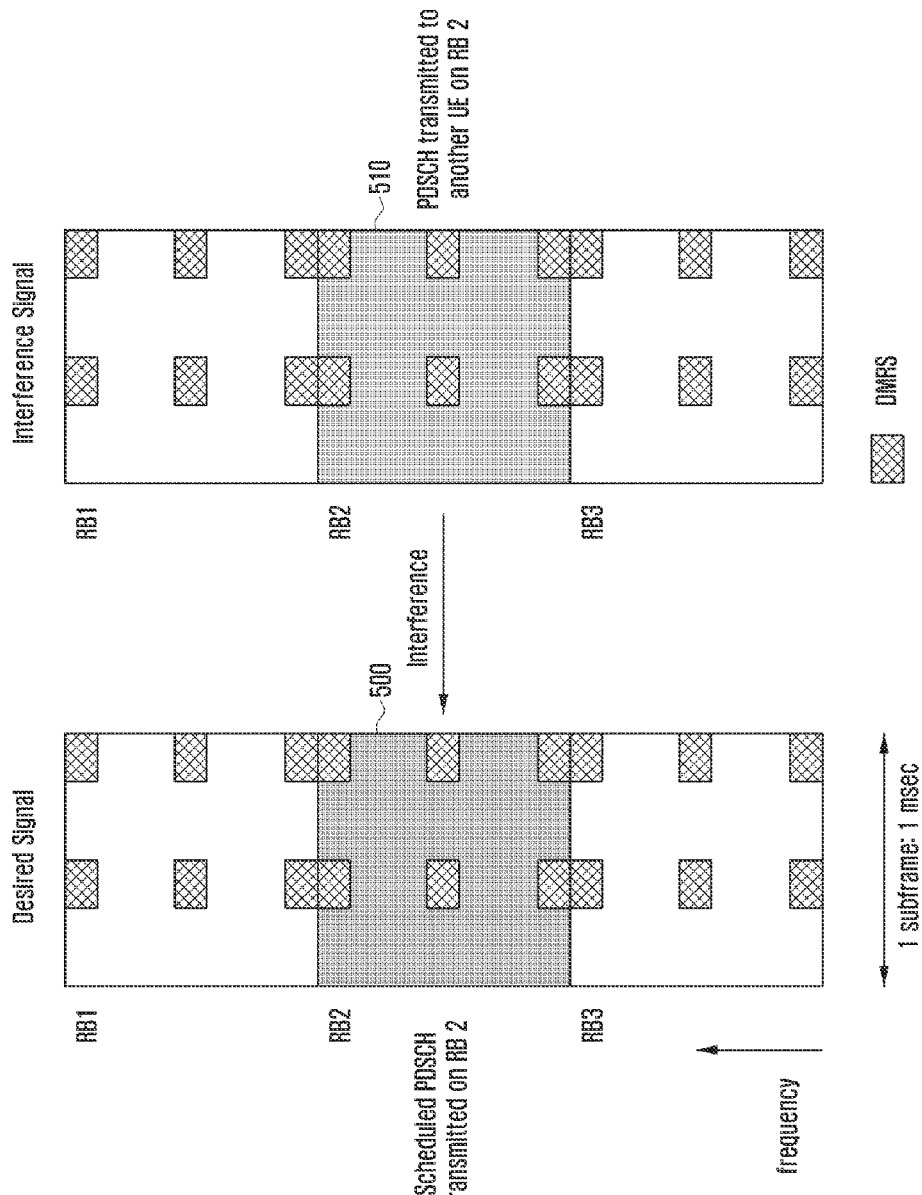
FIG. 5 illustrates a situation in which interference occurs in an LTE/LTE-A system according to an embodiment of the present disclosure.

FIG. 5 illustrates a situation in which interference occurs in an LTE/LTE-A system according to an embodiment of the present disclosure.

Referring to FIG. 5, a UE receives a wireless signal 500 of a PDSCH transmitted by an eNB, through a frequency resource RB #2. At this time, an interference signal 510 transmitted to another UE causes interference to the UE. This interference signal corresponds to one of an inter-TP interference or an intra-TP interference as described above. In the case of LTE/LTE-A system, such a phenomenon occurs when the received signal and the interference signal are transmitted or received in the same frequency interval of the same sub-frame. Therefore, FIG. 5 is based on an assumption that the PDSCH 500 and the interference signal 510 have been transmitted in RB #2.

The UE receiving the PDSCH 500 transmitted through the wireless resource of RB #2 in FIG. 5 needs to accurately determine the reception intensity of interference generated by the interference signal 510, the channel of the interference signal, etc., in order to perform interference management for the interference signal 510.

In general, when one transmission point has a plurality of transmission antennas, the transmission point applies a spatial shaping to a signal by using the transmission antennas and then transmits the signal. This is called precoding, through which a spatial multiplexing can be effectively performed. That is, in FIG. 5, the UE needs to accurately measure the effect of a precoding applied to the interference signal 510 in order to accurately perform the measurement of the interference signal 510.

In FIG. 5, the PDSCH transmitted to the UE is transmitted together with a DMRS. The DMRS is a reference signal supported by the LTE/LTE-A and is a signal transmitted by an eNB to enable a UE receiving a PDSCH to perform channel estimation used for reconstruction of information contained in the PDSCH. The same precoding as that of the PDSCH is applied to the DMRS, and a transmitted DMRS is a signal previously known and promised between a UE and an eNB. Since a previously known and promised signal is transmitted between a UE and an eNB as described above, the UE can effectively obtain information on what influence the wireless channel has on the transmitted signal, to perform channel estimation.

Based on the point that channel estimation used for reception of a signal can be performed using a DMRS as described above, the present disclosure provides measurement of a DMRS of an interference signal by a UE for accurate interference measurement. That is, the UE measures not only a DMRS used for reconstruction of information carried by a PDSCH transmitted to the UE itself, but also a DMRS transmitted together with an interference signal for measurement of the interference signal. When the present disclosure is applied to FIG. 5, the UE receiving the PDSCH 500 transmitted through RB #2 can receive a DMRS of the PDSCH 500 included in RB #2 for reconstruction of information carried by the PDSCH 500 and measure the channel by using the received DMRS. Simultaneously, in order to perform interference management, the UE can receive a DMRS of the interference signal 510 included in the RB #2 and measure the interference channel by using the received DMRS.

By measuring the interference channel as described above, the UE can accurately determine the reception intensity, channel, etc., of interference caused to the UE by a particular interferer and thus can distinguish between dominant interference and non-dominant interference, so as to improve the signal reception capability.

Meanwhile, the DMRS for reception of a PDSCH of a particular UE and the DMRS of an interference signal may be transmitted using different wireless resources to suppress the interference effect on each other.

One method for using different wireless resources is to use different time and frequency resources. That is, by using REs not crossing each other within the same RB, it is possible to prevent interference between DMRSs. Another method is to use different orthogonal codes. In this method, even in a transmission using the same time and frequency resource, different orthogonal codes applied to DMRSs can prevent interference between the DMRSs. For example, a case in which one DMRS is transmitted using an orthogonal code of ++ on the time axis and another DMRS is transmitted using an orthogonal code of +− on the time axis corresponds to this method. A third method for suppressing interference is to randomize the interference as much as possible by applying scrambling.

Figure 6:
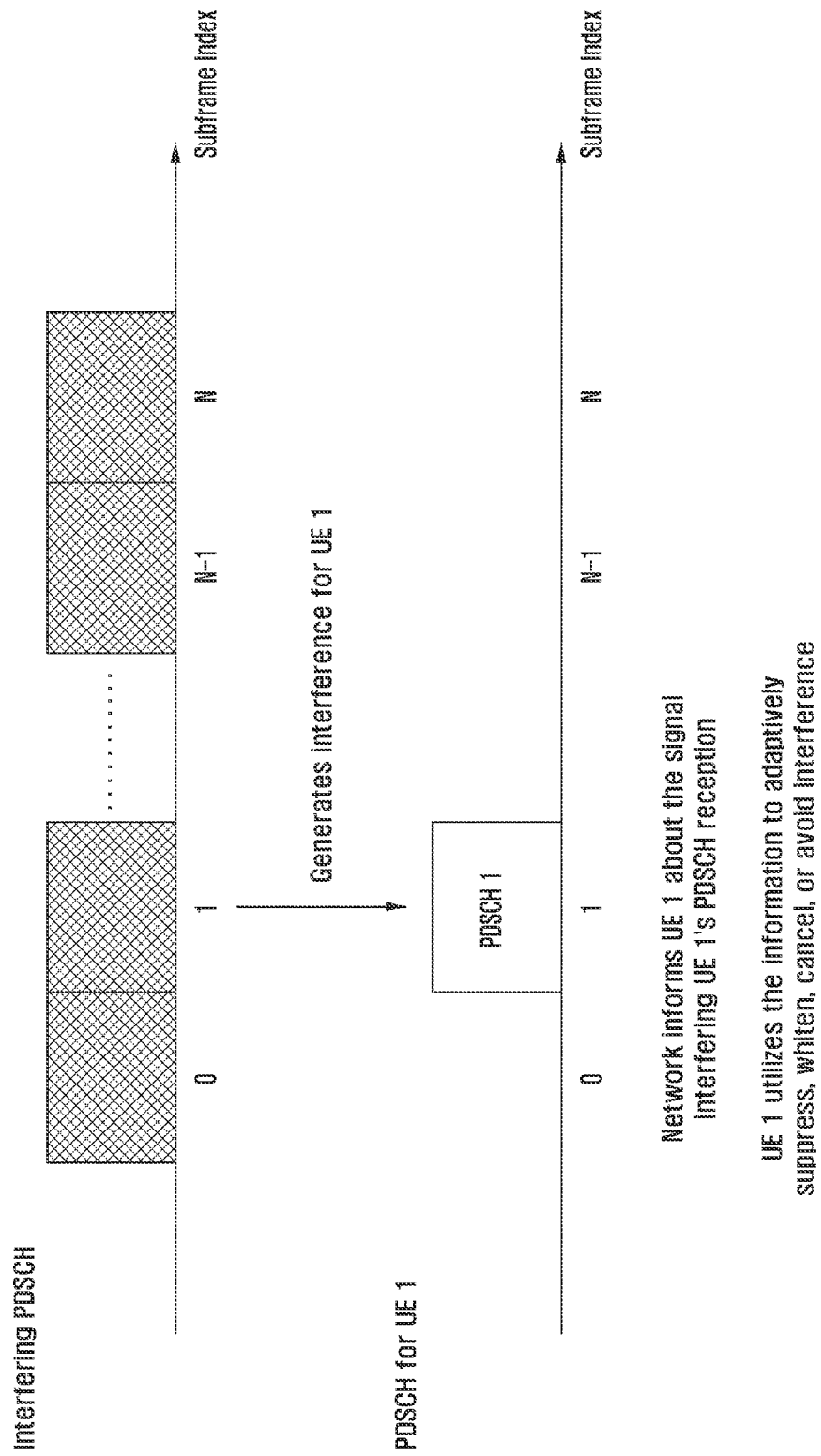
FIG. 6 illustrates interference management performed by a UE in the time domain according to an embodiment of the present disclosure.

FIG. 6 illustrates interference management by a UE along the time domain, that is, according to sub-frame indexes according to an embodiment of the present disclosure.

Referring to FIG. 6, the UE receives PDSCH #1 transmitted by an eNB in sub-frame #1. Further, in the sub-frame in which the UE receives PDSCH #1, the UE simultaneously receives an interference signal (interfering PDSCH) which has been transmitted to another UE. The interference signal degrades the performance of the UE receiver receiving PDSCH #1 and reconstructing information contained in PDSCH #1.

In order to enable a UE to perform an effective interference management for such an interference signal, an eNB provides control information for accurate measurement of the interference signal to the UE according to an embodiment of the present disclosure. The UE accurately measures the interference by using the provided control information and performs interference management of a receiver by using the measured interference.

Information provided to a UE for interference measurement by an eNB includes DMRS-related information of an interference signal. That is, the eNB notifies the UE of which DMRS is to be measured in RBs in which an interference signal exists. The UE can accurately measure the interference channel and the reception intensity of an interference signal by measuring a DMRS for an interfering PDSCH based on the DMRS-related information.

By measuring a DMRS for an interfering PDSCH as described above, it is possible to obtain a higher accuracy than by directly measuring the interfering PDSCH to obtain the interference channel and the reception intensity of the interference signal. This is because a UE can easily obtain information on what sequence is transmitted from a transmitter of an eNB in the case of a DMRS, but the UE cannot easily obtain information on what is transmitted from a transmitter of an eNB in the case of a PDSCH. Without any information on what is transmitted from a transmitter of an eNB, measurement of an interference channel and a reception intensity of an interference signal has a relatively low accuracy.

Due to the reason described above, in obtaining an interference channel and a reception intensity of an interference signal, it is more advantageous to receive and measure a DMRS for an interfering PDSCH, instead of the interfering PDSCH. Since the same precoding is applied to an interfering PDSCH and a DMRS for the interfering PDSCH, the UE can receive and use the DMRS to measure the interference channel and the reception intensity of the interference by the PDSCH.

Figure 7:
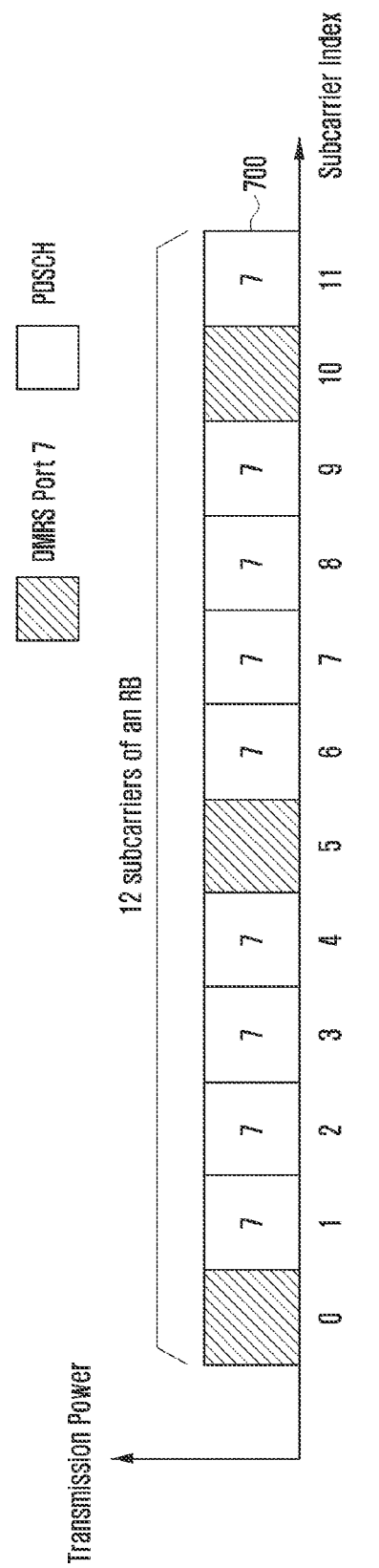
FIG. 7 illustrates transmission of Physical Downlink Shared Channel (PDSCHs) and DeModulation Reference Signals (DMRSs) in an Orthogonal Frequency Division Multiplexing (OFDM) symbol for transmission of a DMRS according to subcarrier indexes according to an embodiment of the present disclosure.

FIG. 7 illustrates transmission of PDSCHs and DMRSs in an OFDM symbol for transmission of a DMRS according to subcarrier indexes according to an embodiment of the present disclosure.

Referring to FIG. 7, the OFDM symbol corresponds to an OFDM symbol 5, 6, 12, or 13 to which DMRS resources are allocated in the RB shown in FIG. 2. In the OFDM symbol for transmission of a DMRS, the DMRSs are transmitted in particular subcarriers as shown in FIG. 7. The transmission power applied to the subcarrier for transmission of a DMRS is the same as the transmission power applied to the subcarrier for transmission of a PDSCH. Therefore, the UE can receive and use a DMRS of an interfering PDSCH to obtain an interference reception intensity of the PDSCH. Further, since the same precoding as that of DMRS port #7 is applied to the PDSCH signal 700 in FIG. 7, the UE can estimate the wireless channel which the PDSCH has undergone by receiving and measuring DMRS port #7.

Meanwhile, the number of DMRS ports allocated to a UE in an LTE/LTE-A system depends on the number of layers used for the MIMO transmission. That is, when an eNB uses N layers to transmit a PDSCH to a particular UE, a total of N DMRS ports are simultaneously transmitted. In general, when a PDSCH is transmitted using N layers, it may be said that the rank of the PDSCH is N.

FIG. 7 is based on an assumption that the PDSCH is transmitted using one layer according to an embodiment of the present disclosure. Therefore, DMRS port #7 is the only DMRS transmitted with the PDSCH in the case illustrated in FIG. 7.

Figure 8:
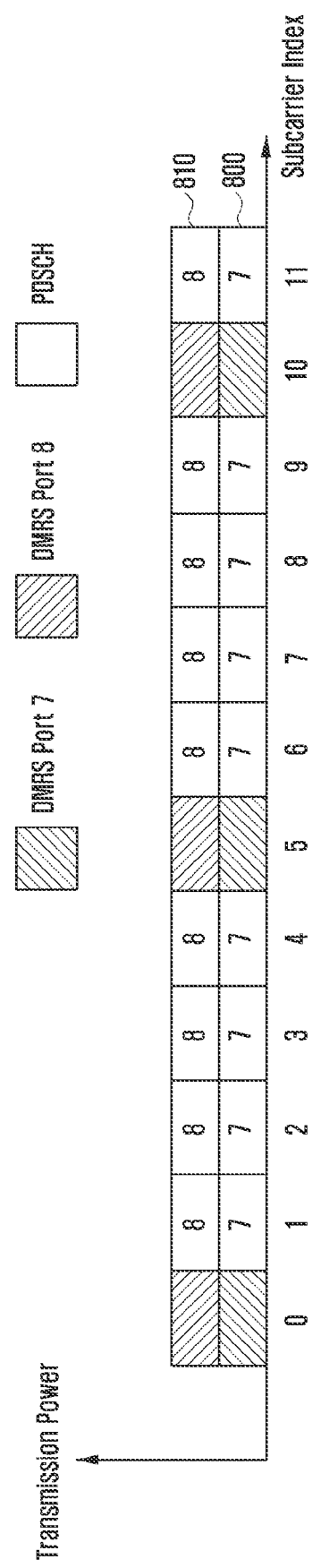
FIG. 8 illustrates transmission of PDSCHs having a rank of 2 according to an embodiment of the present disclosure.

When a PDSCH having a rank of 2 is transmitted to a UE, DMRSs are transmitted in an RB, DMRS port #7 and DMRS port #8 of which are the same as the PDSCH, as shown in FIG. 8.

The same transmission power and the same precoding as those of DMRS port #7 and DMRS port #8 are applied to the two layers of the transmitted PDSCH in FIG. 8, respectively. That is, the same transmission power and the same precoding as those of DMRS port #7 are applied to the PDSCH 800 of the first layer for transmission, and the same transmission power and the same precoding as those of DMRS port #8 are applied to the PDSCH 810 of the second layer for transmission.

The UE receiving the PDSCH as shown in FIG. 8 as an interfering signal can determine the interference channel of each layer and the reception intensity of the interference to the UE itself caused by each layer, by receiving and measuring DMRS port #7 and DMRS port #8 for the interfering PDSCH.

Figure 9:
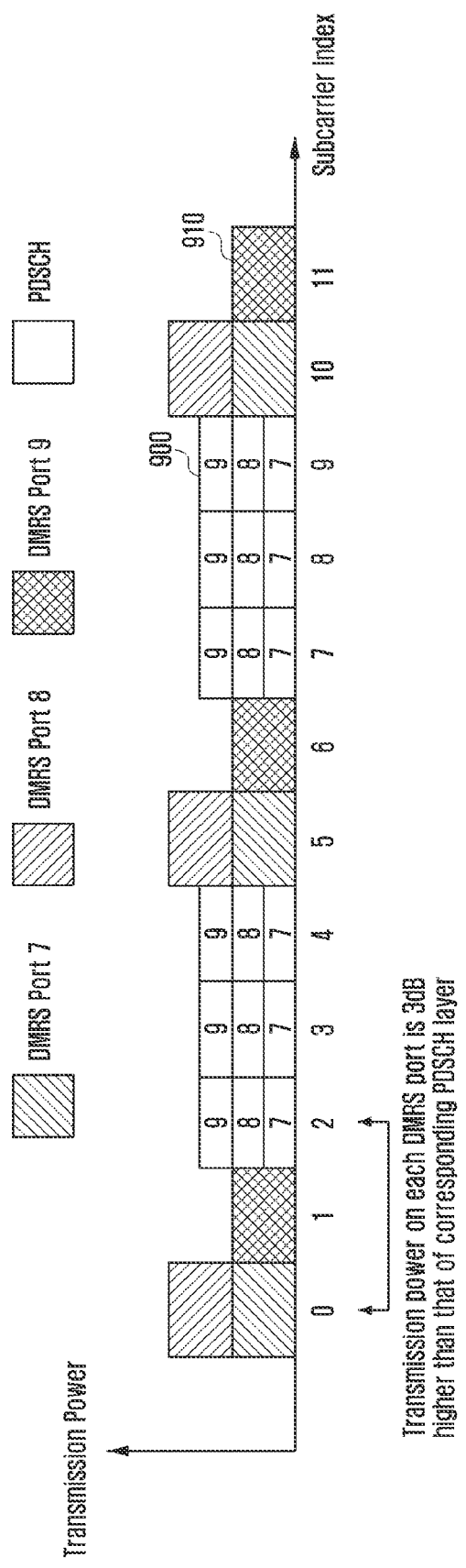
FIG. 9 illustrates transmission of PDSCHs having a rank of 3 according to an embodiment of the present disclosure.

In a situation in which the rank of an interfering PDSCH is 3 or higher as shown in FIG. 9, the UE may have trouble in receiving a DMRS for an interfering PDSCH and measuring an interference reception intensity of the interfering PDSCH.

Referring to FIG. 9, when the rank of a PDSCH transmitted to one UE is 3 or higher, the transmission power allocated to each DMRS port is doubled, that is, increases by 3 dB, in comparison with the case in which the rank of the PDSCH is 1 or 2. For example, in FIG. 9, the transmission power allocated to the PDSCH signal 900 of the third layer has a half value in comparison with DMRS port #9 910, i.e., a value smaller by 3 dB than that of DMRS port #9 910.

When there is a transmission power difference of 3 dB between a DMRS port and a PDSCH layer signal relating to the DMRS port, the UE should recognize the fact that the transmission power applied to the DMRS port is 3 dB higher than that of the PDSCH layer signal, and lower the reception intensity of the interference measured in the DMRS by 3 dB to perform the interference management. If the UE performs interference management in a state in which the UE has no information on or ignores the transmission power difference between the DMRS and the PDSCH, the interference management cannot be efficient.

However, since the UE does not know the rank of a PDSCH serving as interference to the UE itself, the UE cannot determine whether it will lower the reception intensity of the interference estimated in the DMRS by 3 dB to perform the interference management or apply the reception intensity of the interference estimated in the DMRS without change to perform the interference management.

Figure 10:
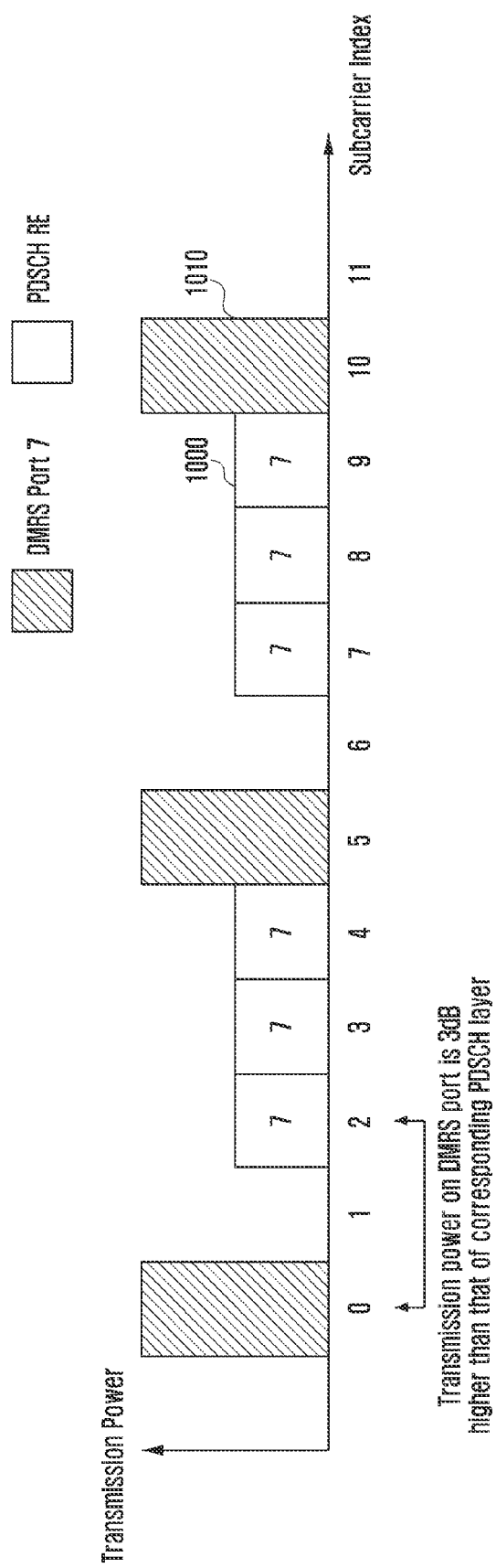
FIG. 10 illustrates application of a zero-power DMRS to an interfering PDSCH according to an embodiment of the present disclosure.

In a situation in which a zero-power DMRS is applied to an interfering PDSCH as shown in FIG. 10, the UE may also have trouble in receiving a DMRS for an interfering PDSCH and measuring an interference reception intensity of the interfering PDSCH.

The zero-power DMRS is used to omit transmission of a signal at a position at which a DMRS can be transmitted, so as to prevent occurrence of interference at that position. For example, as shown in FIG. 10, when UE A receives DMRSs in subcarriers #0, #5, and #10, and UE B receives DMRSs in subcarriers #1, #6, and #11, zero-power DMRSs are applied to subcarriers #1, #6, and #11 for UE A, so as to prevent the DMRSs of UE B from being subjected to interference from a signal for UE A.

When a zero-power DMRS is applied as described above, the transmission power which is not used in a subcarrier to which the zero-power DMRS is applied can be reallocated to a DMRS of the same OFDM symbol to improve the reception capability of the DMRS. That is, as shown in FIG. 10, the transmission power which has not been allocated due to the zero-power DMRSs applied to subcarriers #1, #6, and #11 can be used to raise, by 3 dB, the transmission power of the DMRSs transmitted in subcarriers #0, #5, and #10 of the same OFDM symbol.

Therefore, a difference of 3 dB occurs between the transmission power of the PDSCH 1000 and the transmission power applied to the DMRS port 1010. Therefore, when a zero-power DMRS is applied to a signal transmitted to another UE as described above, in order to achieve an effective interference management, a UE subjected to interference needs to perform the interference management in consideration of the fact that a DMRS for an interfering PDSCH has been transmitted with a 3 dB higher transmission power. However, even in this case also, the UE cannot determine whether a zero-power DMRS has been applied to the interfering PDSCH.

As described above, a DMRS for a PDSCH serving as interference to a UE may have a transmission power higher by 3 dB than the transmission power applied to a signal of a PDSCH layer relating to the transmission power applied to a corresponding DMRS port. Since whether to apply a zero-power DMRS or a rank of an interference signal may change every 1 msec, a UE cannot perform an efficient interference management based on a particular assumption applied to a transmission power allocated to a DMRS port.

Therefore, the present disclosure has been made to address the above problems and provides a method of reporting a transmission power ratio applied between an interfering PDSCH layer signal and a DMRS port for the interfering PDSCH layer signal, so as to enable a UE to perform an accurate measurement of an interference signal. That is, simultaneously while reporting a DMRS for an interfering PDSCH to a UE, an eNB can report information on whether the transmission power for the DMRS is higher by 3 dB than a transmission power applied to a signal of a PDSCH layer relating to a corresponding DMRS port.

In the present disclosure, information transmitted with this purpose from an eNB to a UE is called "interferer transmission power control information", which is defined by Table 1 below according to an embodiment of the present disclosure.

TABLE 1

| interferer transmission power control information | Meaning |
| --- | --- |
| 0 | Identical to the transmission power applied to an interferer PDSCH layer signal relating to a transmission power of a reported interferer DMRS port |

TABLE 1-continued

| interferer transmission power control information | Meaning |
| --- | --- |
| 1 | Higher by 3 dB than the transmission power applied to an interferer PDSCH layer signal relating to a transmission power of a reported interferer DMRS port |

When interferer transmission power control information as defined in Table 1 is applied to the case shown in FIG. 7 or 8, an eNB reports interferer transmission power control information with a value of 0 to a UE. Upon receiving the interferer transmission power control information, the eNB performs interference management based on a determination that the transmission power applied to an interferer DMRS port reported to the UE itself is identical to the transmission power applied to a signal of a related interferer PDSCH layer.

In contrast, in the case of FIG. 9 or 10, the eNB reports interferer transmission power control information with a value of 1 to the UE. Upon receiving the interferer transmission power control information, the eNB performs an interference management based on a determination that the transmission power applied to an interferer DMRS port reported to the UE itself is higher by 3 dB than the transmission power applied to a signal of a related interferer PDSCH layer.

However, values of the interferer transmission power control information are not limited to the values in Table 1, and may be differently defined within a range in which one skilled in the art can change the values, and the definition of the interferer transmission power control information may be provided in advance to the UE.

Figure 11:
FIG. 11 illustrates a format for transmission of interferer transmission power control information according to an embodiment of the present disclosure.

FIG. 11 illustrates a format for transmission of interferer transmission power control information according to an embodiment of the present disclosure.

Referring to FIG. 11, interferer transmission power control information (downlink interference transmission power information) 1120 may be transmitted together with downlink resource allocation information (downlink scheduling information) 1100 and downlink interference information 1110 as Downlink Control Information (DCI). That is, control information for reception of a PDSCH by a UE and information on an interferer are simultaneously transmitted together.

In the LTE/LTE-A, various DCI formats are defined in order to provide a UE with downlink scheduling information for reception of a PDSCH by the UE. A new DCI format may be defined in order to transmit interferer transmission power control information provided by the present disclosure. The newly defined DCI format is applied to only a UE having an interference management function.

Therefore, when a UE accesses a system, the UE notifies an eNB of whether the UE has an interference management function. Then, based on the notified information, the eNB determines whether to apply a DCI format, including the interferer transmission power control information 1120 as shown in FIG. 11, to the UE. When the eNB has determined to apply a DCI format including the interferer transmission power control information to a particular UE, the eNB notifies the UE of the determination through a higher layer signaling and transfers the control information to the UE by using the DCI format.

Among the information transmitted together with the interferer transmission power control information 1120 in FIG. 11, the downlink scheduling information 1100 includes at least one of information on a frequency resource by which a PDSCH received by a UE is transmitted, rank information of the PDSCH, and DMRS-related information for the PDSCH. Further, the downlink scheduling information 1100 is transmitted together with the downlink interference information 1110. The downlink interference information 1110 includes information relating to a DMRS for a PDSCH serving as interference to the UE. By receiving the downlink interference information 1110, the UE can determine a DMRS port which the UE is to measure, to perform interference measurement for the PDSCH serving as an interference signal to the UE itself.

FIG. 11 corresponds to a representative example of transmission of interferer transmission power control information to a UE by an eNB using physical layer signaling according to an embodiment of the present disclosure. The use of physical layer signaling is advantageous in that the interferer transmission power control information can accurately reflect information of an interfering PDSCH in an actual wireless environment. In contrast, the use of physical layer signaling is also disadvantageous in that it may be used to perform the signaling in each sub-frame, i.e., every 1 msec, which may increase the downlink overhead.

Therefore, instead of using physical layer signaling to transmit the interferer transmission power control information, it is possible to use higher layer signaling for the transmission. In this event, the downlink overhead can be reduced. However, it is impossible in that case to accurately reflect the interfering PDSCH.

In addition to the method in which an eNB explicitly notifies a UE of whether the transmission power of an interferer DMRS port is higher than the transmission power of an interferer PDSCH as in the embodiments described above, the eNB may provide the UE with information by which the UE can determine by itself whether the transmission power of an interferer DMRS port is higher than or equal to the transmission power of an interferer PDSCH. In this event, the interferer transmission power control information described above may be defined as information explicitly or implicitly indicating whether the transmission power of an interferer DMRS port is higher than the transmission power of an interferer PDSCH.

Specifically, when the interference signal, i.e. the interferer PDSCH, corresponds to the rank 1 transmission or rank 2 transmission as shown in FIGS. 7 and 8, the transmission power of the interferer DMRS port is equal to the transmission power of the interference signal. However, when the interference signal corresponds to the rank 3 or higher as shown in FIG. 9 or when a zero-power DMRS is applied to the interference signal as shown in FIG. 10, the transmission power of the interferer DMRS port is higher by 3 dB than the transmission power of the interference signal.

Therefore, simultaneously while notifying a UE of downlink interferer information, i.e., DMRS port information to be measured by the UE, an eNB can provide the UE with information relating to a case where the DMRS port transmission power may be determined to be larger than the PDSCH transmission power, for example, at least one piece of information among rank information of the interference signal and information on whether to apply a zero-power DMRS. However, without being limited to the embodiments described above, the eNB may provide the UE with any information by which the UE can determine the interferer DMRS port transmission power.

When receiving information by which the UE can determine the interferer DMRS port transmission power, for example, at least one piece of information among the rank information of the interference signal and the information on whether to apply a zero-power DMRS, from the eNB, the UE determines, based on the received information, whether to employ an assumption that the DMRS port transmission power is equal to the interference signal transmission power or an assumption that the DMRS port transmission power is higher by 3 dB than the interference signal transmission power, in the interference measurement. Thereafter, the UE applies the determined transmission power information to the interference measurement.

Figure 12:
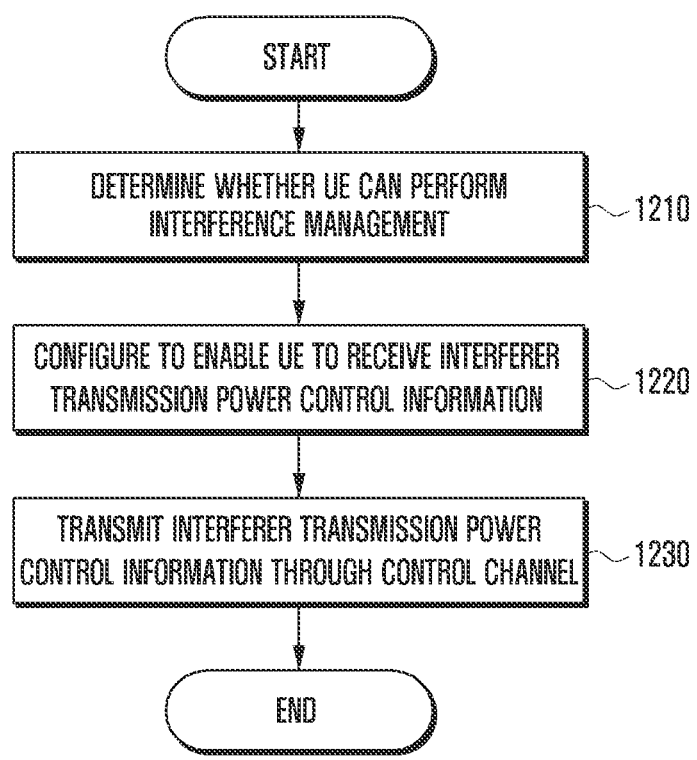
FIG. 12 illustrates a process of notifying a UE of interferer transmission power control information by an evolved Node B (eNB) according to an embodiment of the present disclosure.

FIG. 12 illustrates a process of notifying a UE of interferer transmission power control information by an eNB according to embodiments of the present disclosure described above.

Referring to FIG. 12, in operation 1210, an eNB determines whether a UE can perform an interference management function. Information on whether the UE can perform an interference management function can be determined based on UE capability information defined for each UE in the LTE/LTE-A system, or can be obtained from other control information. Further, operation 1210 may be carried out in the process in which the UE notifies the eNB and the network of its existence and its resources while accessing the system.

When it is determined in operation 1210 that the UE can perform the interference management function, the eNB establishes a configuration to enable the UE to receive interferer transmission power control information in operation 1220. That is, in operation 1220, the eNB establishes a configuration to enable the UE to receive a predefined DCI format as shown in FIG. 11. Since a configuration of a transmission mode automatically determines a DCI format in the LTE/LTE-A system, the configuration to enable the UE to receive interferer transmission power control information may be considered to be the same as a configuration of a transmission mode for performing interference management by the UE.

After the configuration for reception of interferer transmission power control information for the UE is completed in operation 1220, the eNB transmits the configured DCI format to the UE by using a PDCCH or an Enhanced-PDCCH (E-PDCCH) to notify the UE of the interferer transmission power control information in operation 1230. As described above, the interferer transmission power control information refers to information explicitly or implicitly indicating whether the transmission power of an interferer DMRS port is higher than the transmission power of an interferer PDSCH.

Meanwhile, in operation 1230, if the interference of which the eNB notifies the UE is intra-TP interference, the eNB can determine by itself a value of the interferer transmission power control information to be configured. In contrast, if the interference of which the eNB notifies the UE is inter-TP interference, the eNB may need to exchange information with another eNB to determine a value of the interferer transmission power control information in order to be configured.

The interferer transmission power control information exchanged between the eNBs as described above may be configured by a plurality of bits rather than one bit, and each RB or each bundle of multiple RBs may be allocated one bit. For example, when there are three RBs and each RB is allocated one bit of interferer transmission power control information, a particular eNB may notify another eNB of "111" as its own interferer transmission power control information, so as to report that the transmission power allocated to the DMRS port in the three RBs is higher by 3 dB than the transmission power allocated to a signal of a PDSCH layer related thereto. Further, in consideration of the case of transmission of multiple layers, a plurality of bits may be each RB or each bundle of RBs to enable an exchange of interferer transmission power control information of multiple PDSCH layers between eNBs.

Figure 13:
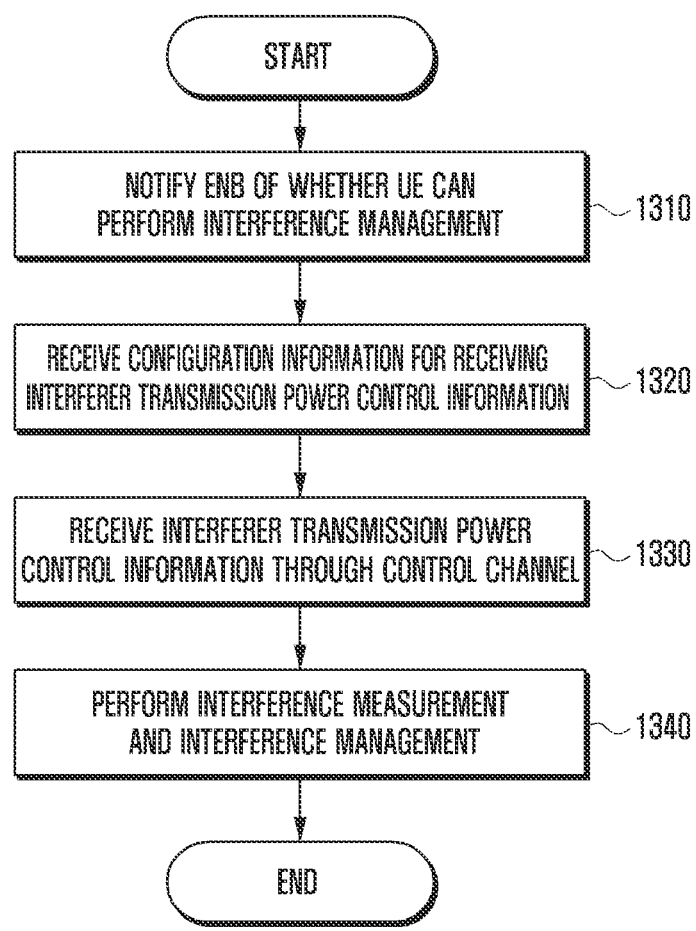
FIG. 13 illustrates a process of receiving interferer transmission power control information by a UE according to an embodiment of the present disclosure.

FIG. 13 illustrates a process of receiving interferer transmission power control information by a UE according to embodiments of the present disclosure described above.

Referring to FIG. 13, in operation 1310, a UE notifies an eNB of whether the UE can perform an interference management function. As described above, in the LTE/LTE-A system, the UE can notify the eNB of whether the UE can perform an interference management function by transmitting its own UE capability information to the eNB or by transmitting other control information to the eNB.

Then, in operation 1320, the UE is configured to receive interferer transmission power control information by the eNB. In the LTE/LTE-A system, in a process in which the eNB configures the downlink transmission mode of the UE, the UE may be configured to receive the interferer transmission power control information.

The UE configured to be capable of receiving the interferer transmission power control information in operation 1320 is notified of a DCI format including the interferer transmission power control information through a PDCCH/E-PDCCH transmitted by the eNB in operation 1330. The DCI format may include DMRS-related information for an interfering PDSCH and interferer transmission power control information together with downlink resource allocation-related information.

Upon receiving the interferer transmission power control information in operation 1330, by using the DMRS-related information for an interfering DMRS notified of together with the interferer transmission power control information, the UE accurately measures the interference and performs interference management by using a result of the measurement in operation 1340. The interference management of the UE may be performed using IRC, SIC, etc. as described above.

Figure 14:
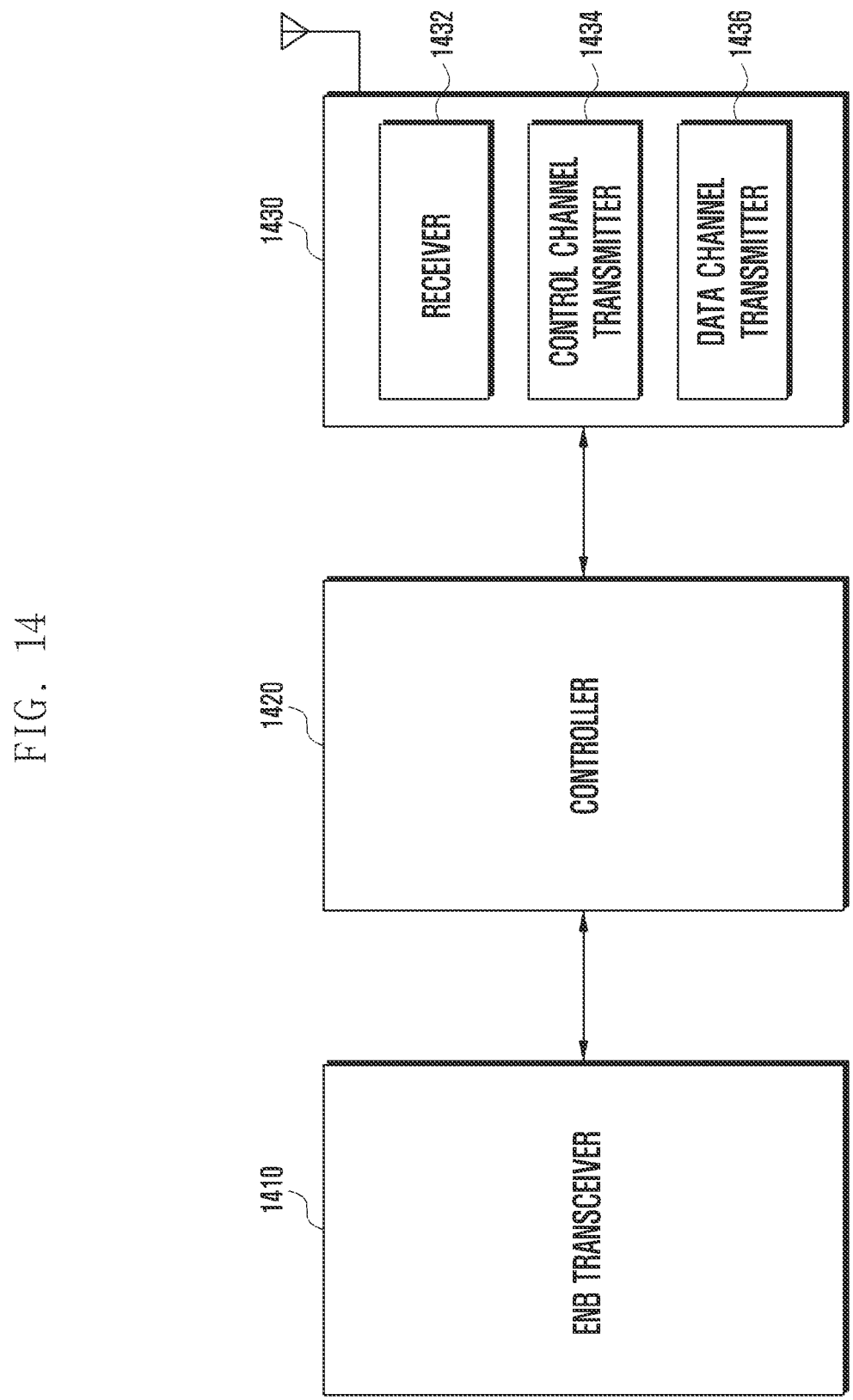
FIG. 14 is a block diagram illustrating a construction of an eNB for transmitting interferer transmission power control information to a UE according to an embodiment of the present disclosure.

FIG. 14 is a block diagram illustrating a construction of an eNB for transmitting interferer transmission power control information to a UE according to an embodiment of the present disclosure.

Referring to FIG. 14, the eNB may include an eNB transceiver 1410, a controller 1420, and a UE transceiver 1430. The UE transceiver 1430 may include a receiver 1432, a control channel transmitter 1434, and a data channel transmitter 1436.

The controller 1420 communicates with a central controller managing another eNB or a plurality of eNBs by using the eNB transceiver 1410. As described above, in the case of inter-TP interference, the eNB must exchange information with another eNB to determine how to configure interferer transmission power control information for each RB. To this end, the eNB transceiver 1410 may be used.

Further, the controller 1420 may be notified of whether a UE supports an interference management function by the UE, by using the UE transceiver 1430 and the receiver 1432. Based on the notified information, the controller 1420 may configure the UE to receive the interferer transmission power control information and may transmit transmission power control information to the UE when transmitting a PDSCH, by using the control channel transmitter 1434 and the data channel transmitter 1436 of the UE transceiver 1430.

pFIG. 15 is a block diagram illustrating a construction of a UE for receiving interferer transmission power control information from an eNB according to an embodiment of the present disclosure.

Figure 15:
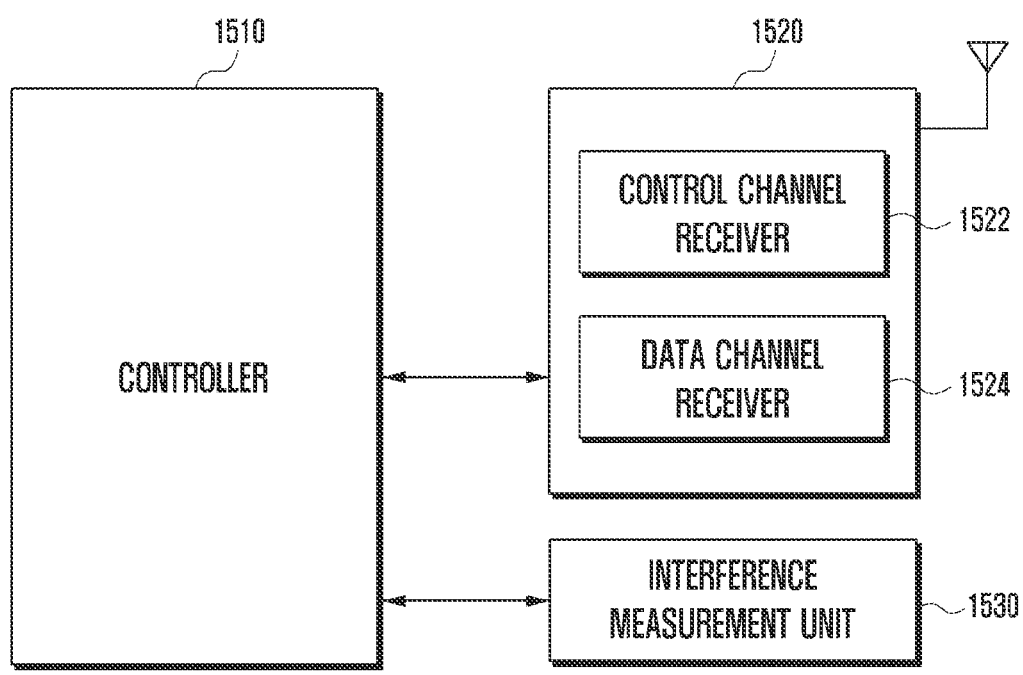
FIG. 15 is a block diagram illustrating a construction of a UE for receiving interferer transmission power control information from an eNB according to an embodiment of the present disclosure.

Referring to FIG. 15, the UE may include a controller 1510, a transceiver 1520, and an interference measurement unit 1530, and the transceiver 1520 may include a control channel receiver 1522 and a data channel receiver 1524.

The controller 1510 receives interferer transmission power control information from the eNB by using the control channel receiver 1522 of the transceiver 1520. The interference measurement unit 1530 measures interference by using DMRS-related information for an interferer notified together with the interferer transmission power control information, and the data channel receiver 1524 performs interference management for a received PDSCH by using the measured interference. Meanwhile, the interference measurement and the interference management may be performed by the controller 1510.

Those skilled in the art will appreciate that it is possible to implement the present disclosure in another specific form without changing the technical idea or the indispensable characteristics of the present disclosure. Therefore, it should be understood that the above-described embodiments are illustrative and are not limiting under any possible interpretation. The scope of the present disclosure is defined by the appended claims to be described later, rather than the detailed description. Accordingly, it will be appreciated that all modifications or variations derived from the meaning and scope of the appended claims and their equivalents are included in the range of the present disclosure.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of transmitting control information to a terminal by a base station in a wireless communication system, the method comprising:
    determining whether the terminal supports interference management for receiving a data signal transmitted from the base station;
    if it is determined that the terminal supports the interference management, transmitting, to the terminal, configuration information for receiving the data signal by applying the interference management by the terminal; and
    transmitting, to the terminal, downlink control information including information on a transmission power ratio between an interfering data signal of an interference signal and a demodulation reference signal (DMRS) of the interference signal, for estimating an interference caused by the interfering data signal.

2. The method of claim 1, wherein the information on the transmission power ratio is configured based on transmission power information received from a base station transmitting the interference signal.

3. The method of claim 1, wherein the information on the transmission power ratio comprises a bit number configured based on at least one of rank information and resource block information of the interference signal.

4. The method of claim 1,
    wherein the transmitting of the downlink control information uses a predefined downlink control information (DCI) format, and
    wherein the downlink control information further comprises downlink resource allocation information.

5. The method of claim 1, wherein the downlink control information further comprises interference information for measuring the DMRS which corresponds to the interfering data signal.

6. A method of receiving control information from a base station by a terminal in a wireless communication system, the method comprising:
    transmitting, to the base station, information on whether the terminal supports interference management for receiving a data signal transmitted from the base station;
    receiving, from the base station, configuration information for receiving the data signal by applying the interference management;
    receiving, from the base station, downlink control information including information on a transmission power ratio between an interfering data signal of an interference signal and a demodulation reference signal (DMRS) of the interference signal; and
    estimating information of the interfering data signal by measuring the DMRS based on the information on the transmission power ratio, and receiving the data signal by using a result of the estimating.

7. The method of claim 6, wherein the information on the transmission power ratio comprises a bit number configured based on at least one of rank information and resource block information of the interference signal.

8. The method of claim 6,
    wherein the receiving of the downlink control information uses a predefined downlink control information (DCI) format, and
    wherein the downlink control information further comprises downlink resource allocation information.

9. The method of claim 6,
    wherein the downlink control information further comprises interference information for measuring the DMRS which corresponds to the interfering data signal and,
    wherein, in the receiving of the data signal, a signal received through a DMRS port included in the interference information is measured.

10. The method of claim 6, wherein, in the receiving of the data signal, at least one of interference rejection combining (IRC) and successive interference cancellation (SIC) is performed using the result of the estimating.

11. A base station for transmitting control information to a terminal in a wireless communication system, the base station comprising:
    a transceiver configured to transmit and receive a signal to and from the terminal; and
    a controller configured to:
        determine whether the terminal supports interference management for receiving a data signal transmitted from the base station,
        transmit configuration information for receiving the data signal by applying the interference management by the terminal if it is determined that the terminal supports the interference management, and
        transmit downlink control information including information on a transmission power ratio between an interfering data signal of an interference signal and a demodulation reference signal (DMRS) of the interference signal, for estimating an interference caused by the interfering data signal.

12. The base station of claim 11, wherein the information on the transmission power ratio is configured based on transmission power information received from an base station transmitting the interference signal.

13. The base station of claim 11, wherein the information on the transmission power ratio comprises a bit number configured based on at least one of rank information and resource block information of the interference signal.

14. The base station of claim 11,
wherein the controller is further configured to transmit the downlink control information by using a predefined downlink control information (DCI) format, and
wherein the downlink control information further comprises downlink resource allocation information.

15. The base station of claim 11, wherein the downlink control information further comprises interference information for measuring the DMRS which corresponds to the interfering data signal.

16. A terminal for receiving control information from a base station in a wireless communication system, the terminal comprising:
a transceiver configured to transmit and receive a signal to and from the base station; and
a controller configured to:
transmit, to the base station, information on whether the terminal supports interference management for receiving a data signal transmitted from the base station,
receive, from the base station, configuration information for receiving the data signal by applying the interference management,
receive, from the base station, downlink control information including information on a transmission power ratio between an interfering data signal of an interference signal and a demodulation reference signal (DMRS) of the interference signal,
estimate information of the interfering data signal by measuring the DMRS based on the information on the transmission power ratio, and
receive the data signal by using a result of the estimating.

17. The terminal of claim 16, wherein the information on the transmission power ratio comprises a bit number configured based on at least one of rank information and resource block information of the interference signal.

18. The terminal of claim 16,
wherein the controller is further configured to receive the downlink control information by using a predefined downlink control information (DCI) format, and
wherein the downlink control information further comprises downlink resource allocation information.

19. The terminal of claim 16,
wherein the downlink control information further comprises interference information for measuring the DMRS which corresponds to the interfering data signal, and
wherein the controller is further configured to measure a signal received through a DMRS port included in the interference information.

20. The terminal of claim 16, wherein the controller is further configured to perform at least one of interference rejection combining (IRC) and successive interference cancellation (SIC) by using the result of the estimating.

* * * * *